(12) United States Patent
Moscoso et al.

(10) Patent No.: US 6,752,980 B1
(45) Date of Patent: Jun. 22, 2004

(54) UZM-16: A CRYSTALLINE ALUMINOSILICATE ZEOLITIC MATERIAL

(75) Inventors: Jaime G. Moscoso, Mount Prospect, IL (US); Wharton Sinkler, Des Plaines, IL (US); Gregory J. Lewis, Mount Prospect, IL (US); Deng-Yang Jan, Elk Grove Village, IL (US); Susan C. Koster, Carpentersville, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/395,639

(22) Filed: Mar. 21, 2003

(51) Int. Cl.$^7$ .......................... C01B 39/48; B01J 29/70; C10G 11/05
(52) U.S. Cl. ...................... 423/718; 423/706; 423/713; 502/85; 208/46
(58) Field of Search ................................ 423/718, 705, 423/706, 713; 502/85; 208/46

(56) References Cited

U.S. PATENT DOCUMENTS

| | | | |
|---|---|---|---|
| 2,950,952 A | | 8/1960 | Breck et al. .................. 23/113 |
| 3,567,372 A | * | 3/1971 | Clarke ........................ 423/700 |
| 3,699,139 A | | 10/1972 | Rubin et al. ............ 260/448 C |
| 4,522,800 A | * | 6/1985 | Baltes et al. ................ 423/707 |
| 4,842,836 A | * | 6/1989 | Lok et al. .................... 423/718 |
| 5,397,561 A | * | 3/1995 | Smith .......................... 423/704 |

OTHER PUBLICATIONS

J. M. Bennett and J. A. Gard, Nature, 214, 1005 (1967).
M. L. Occelli, R. A. Innes, S. S. Pollack, and J. V. Saners, Zeolites, 7,265 (1987).
J. V Sanders, M. L. Occelli, R. A. Innes, and S. S. Pollack, Studies in Surface Science and Catalysis, Ed. Y. Murakami, A. Iijima and J. W. Ward, Elsevier, New York, 28, 429, (1986).
R. Aiello and R. Barrer, J. Chem. Soc. (A), 1470, (1970).

* cited by examiner

*Primary Examiner*—David Sample
(74) *Attorney, Agent, or Firm*—John G. Tolomei; Frank S. Molinaro

(57) ABSTRACT

An aluminosilicate zeolite and substituted version designated UZM-16 have been synthesized. These zeolites are prepared using benzyltrimethyl-ammonium (BzTMA) cation or a combination of BzTMA and at least one other quaternary ammonium cation These zeolites have a structure that is related to offretite, but shows structurally different and distinct features. The UZM-16 zeolites can be dealuminated to form UZM-16HS zeolites which have different acidity, porosity and ion-exchange properties. Both UZM-16 and UZM-16HS are useful in various hydrocarbon conversion processes.

19 Claims, 2 Drawing Sheets

… (US 6,752,980 B1)

UZM-16: A CRYSTALLINE ALUMINOSILICATE ZEOLITIC MATERIAL

FIELD OF THE INVENTION

This invention relates to an aluminosilicate zeolitic material identified as UZM-16. The material can be dealuminated to form UZM-16HS providing materials with different acidity, porosity, and ion-exchange properties. UZM-16 and UZM-16HS are useful in hydrocarbon conversion processes.

BACKGROUND OF THE INVENTION

Zeolites are crystalline aluminosilicate compositions which are microporous and which are formed from corner sharing $AlO_2$ and $SiO_2$ tetrahedra. Numerous zeolites, both naturally occurring and synthetically prepared are used in various industrial processes. Synthetic zeolites are prepared via hydrothermal synthesis employing suitable sources of Si, Al, as well as structure directing agents such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversions, which can take place on outside surfaces as well as on internal surfaces within the pore.

A synthetic zeolite designated Zeolite T has been prepared in the Na, K system and disclosed by Breck and Acara in U.S. Pat. No. 2,950,952. A subsequent crystallographic investigation employing electron diffraction (J. M. Bennett and J. A. Gard, Nature, 214, 1005 (1967)) provided distinctions and established the uniqueness of the offretite and erionite frameworks and classified Zeolite T as an intergrowth of the two structures. A synthetic zeolite with the offretite structure free of erionite intergrowth was prepared in the Na, K, TMA and K, TMA systems (R. Aiello and R. Barrer, J. Chem. Soc. (A), 1470, (1970)). Rubin and Rosinsky were able to prepare a material related to erionite in the benzyltrimethylammonium (BzTMA), Na, K system (U.S. Pat. No. 3,699,139). Working in the same system, an offretite sample free of x-ray diffraction lines due to erionite were prepared (M. L. Occelli, R. A. Innes, S. S. Pollack, and J. V. Sanders, Zeolites, 7, 265 (1987)). An electron diffraction study of offretite, erionite, and offretite-erionite species resulting from syntheses that cover six organic template systems, including BzTMA, characterize the many types of faults that occur in this system (J. V Sanders, M. L. Occelli, R. A. Innes, and S. S. Pollack, Studies in Surface Science and Catalysis, Ed. Y. Murakami, A. Iijima, and J. W. Ward, Elsevier, New York, 28, 429, (1986)).

Applicants have now prepared a zeolite designated UZM-16 which has some similarities to offretite, but has sufficient differences rendering it a unique new structure. UZM-16 can be prepared in the benzyltrimethylammonium (BzTMA) system with a small amount of additional potassium. The x-ray diffraction pattern is similar to offretite, lacking the lines associated with erionite, but also includes a broad line in the pattern centered at about d=21.5 Å, that includes unresolved peaks extending from d=18 Å to about 27 Å. This feature is observed in the electron diffraction patterns of the crystals and as fringes in high resolution lattice images. In addition, a unique periodicity observed in the a-b plane that is not known for offretite and erionite is observed in the electron diffraction patterns of UZM-16. UZM-16 has more mesoporous character than offretite.

SUMMARY OF THE INVENTION

This invention relates to a new family of zeolites, a process for preparing the zeolites and processes using the zeolites. Accordingly, one embodiment of the invention is a microporous crystalline zeolite having a composition in the as-synthesized form in terms of mole ratios of the elements given by

$$M_m^{n+}R_r^{p+}Al_{(1-x)}E_xSi_yO_z \qquad (1)$$

where M is at least one exchangeable cation selected from the group consisting of alkali and alkaline earth metals, "m" is the mole ratio of M to (Al+E) and varies from 0 to about 0.75, R is benzyltrimethylammonium (BzTMA) cation or a combination of BzTMA and at least one quaternary ammonium cation, "r" is the mole ratio of R to (Al+E) and has a value of about 0.25 to about 5.0, E is an element selected from the group consisting of Ga, Fe, In, Cr, B, and mixtures thereof "x" is the mole fraction of E and varies from 0 to about 1.0, "n" is the weighted average valence of M and has a value of about +1 to about +2, "p" is the weighted average valence of R and has a value of +1 to about +2, "y" is the mole ratio of Si to (Al+E) and has a value from greater than 3 to about 25 and "z" is the mole ratio of O to (Al+E) and has a value determined by the equation:

$$z=(m \cdot n+r \cdot p+3+4 \cdot y)/2;$$

the zeolite characterized in that it has an x-ray diffraction pattern having at least the d-spacings and relative intensities set forth in Table A.

TABLE A

| 2-θ | d (Å) | I/I$_0$ % |
|---|---|---|
| 3.86–4.22 | 22.87–20.92 | w–m |
| 7.60–7.84 | 11.62–11.27 | s–vs |
| 11.58–11.86 | 7.64–7.46 | w–m |
| 13.29–13.54 | 6.65–6.53 | m |
| 13.90–14.20 | 6.36–6.23 | w |
| 15.34–15.68 | 5.77–5.65 | m |
| 19.30–19.65 | 4.60–4.51 | m |
| 20.37–20.73 | 4.35–4.28 | m–s |
| 23.18–23.54 | 3.83–3.78 | m–s |
| 23.57–23.89 | 3.77–3.72 | s–vs |
| 24.68–25.03 | 3.60–3.55 | m–s |
| 26.84–27.23 | 3.32–3.27 | m |
| 28.15–28.58 | 3.17–3.12 | m |
| 31.25–31.71 | 2.86–2.82 | vs |
| 33.37–33.76 | 2.68–2.65 | w |
| 35.89–36.36 | 2.50–2.47 | m |
| 48.05–48.52 | 1.89–1.87 | w–m |
| 51.38–51.90 | 1.78–1.76 | w–m |
| 55.35–56.04 | 1.66–1.64 | w–m |
| 58.08–58.64 | 1.59–1.57 | w |

Another embodiment of the invention is a process for preparing the above-described zeolites which comprises forming a reaction mixture containing reactive sources of M, R, Al, Si and optionally E and heating the reaction mixture at a temperature of about 80° C. to about 160° C., the reaction mixture having a composition expressed in terms of mole ratios of the oxides of:

$$aM_{2/n}O:bR_{2/p}O:(1-c)Al_2O_3:cE_2O_3:dSiO_2:eH_2O$$

where "a" has a value of 0 to about 5, "b" has a value of about 1 to about 120, "c" has a value of 0 to about 1.0, "d" has a value of about 5 to about 100, and "e" has a value of about 50 to about 15000.

A further embodiment of the invention is a microporous crystalline zeolite having an empirical composition on an anhydrous basis in terms of mole ratios of the elements of:

$$M1_n^{n+}Al_{(1-x)}E_xSi_{y'}O_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0.01 to about 50, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 3 and z" is the mole ratio of O to (Al+E) and has a value determined by the equation:

$$z''=(a \cdot n+3+4 \cdot y')/2;$$

the zeolite characterized in that it has an x-ray diffraction pattern having at least the d-spacings and relative intensities set forth in Table B.

TABLE B

| 2-θ | d (Å) | I/I₀ % |
|---|---|---|
| 7.70–8.40 | 11.47–10.52 | m–vs |
| 11.70–12.10 | 7.56–7.31 | w |
| 13.35–14.56 | 6.63–6.08 | s–vs |
| 20.60–21.70 | 4.31–4.09 | w |
| 24.60–25.65 | 3.62–3.47 | m–s |

Another embodiment of the invention is a process for preparing a modified microporous crystalline zeolite having an empirical composition on an anhydrous basis in terms of mole ratios of the elements of:

$$M1_n^{n+}Al_{(1-x)}E_xSi_{y'}O_z$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0.01 to about 50, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 3 and z" is the mole ratio of O to (Al+E) and has a value determined by the equation:

$$z''=(a \cdot n+3+4 \cdot y')/2$$

the process comprising treating a starting zeolite at treating conditions thereby removing at least a portion of the framework aluminum and optionally inserting silicon into the framework to provide the modified zeolite; the starting zeolite having an empirical formula on an anhydrous basis of:

$$M'^{n+}_{m'}R^{p+}_{r'}Al_{(1-x)}E_xSi_{y'}O_{z'}$$

where M' is an exchangeable cation selected from the group consisting of ammonium ion, hydrogen ion, alkali metals, alkaline earth metals, rare earth metals and mixtures thereof, n is the weighted average valence of M' and varies from +1 to about +3, m' is the mole ratio of M' to (Al+E) and varies from 0 to about 5.75, R is benzyltrimethylammonium (BzTMA) cation or a combination of BzTMA and an organoammonium cation selected from the group consisting of protonated amines, protonated diamines, protonated alkanolamines, quaternary ammonium ions, diquarternary ammonium ions, quaternized alkanolammonium ions and mixtures thereof, p is the average weighted valence of the organic cation and varies from about +1 to about +2, r' is the mole ratio of R to (Al+E) and varies from 0 to about 5.75, r'+m'>0, y' is the ratio of Si to (Al+E) and varies from greater than 3 to about 25 and z' is the mole ratio of O to (Al+E) and has a value given by the equation:

$$z'=(m' \cdot n+r' \cdot p+3+4 \cdot y')/2.$$

Yet another embodiment of the invention is a hydrocarbon conversion process using any of the above-described zeolites. More specifically the hydrocarbon conversion process is conversion of cyclic compounds to non-cyclic compounds, i.e. linear or branched compounds.

These and other objects and embodiments will become more apparent after the following detailed description of the invention.

DETAILED DESCRIPTION OF THE INVENTION

Figure 1A:
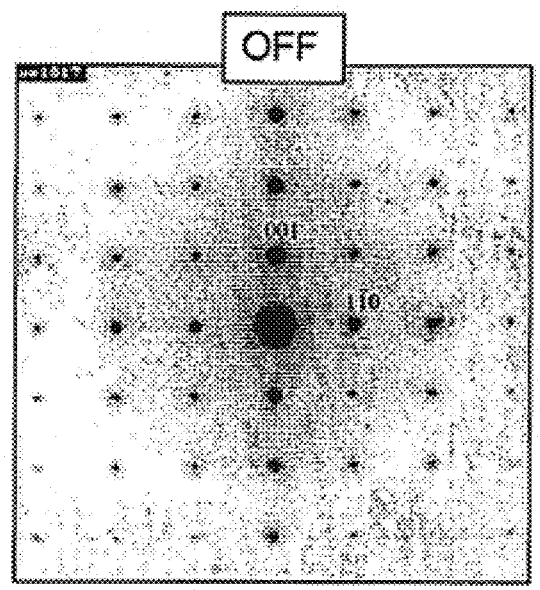
FIG. 1 presents electron diffraction patterns of offretite (FIG. 1A) and UZM-16 (FIG. 1B) from example 1, each taken along [110].

Applicants have synthesized a new family of zeolites designated UZM-16. In its as-synthesized form, the UZM-16 zeolite has a composition on an anhydrous basis that is represented by the formula:

$$M_m^{n+}R_r^{p+}Al_{(1-x)}E_xSi_yO_z \qquad (1)$$

where M is an exchangeable cation and is selected from the group consisting of alkali and alkaline earth metals. Specific examples of the M cations include but are not limited to lithium, sodium, potassium, cesium, strontium, calcium, magnesium, barium and mixtures thereof, but potassium and sodium are preferred. The value of "m" which is the mole ratio of M to (Al+E) varies from 0 to about 0.75. R is benzyltrimethylammonium (BzTMA) cation or a combination of BzTMA and at least one organoammonium cation selected from the group consisting of quaternary ammonium cations, protonated amines, protonated diamines, protonated alkanolamines, diquarternary ammonium cations, quaternized alkanolammonium cations and mixtures thereof. The value of "r" which is the mole ratio of R to (Al+E) varies from about 0.25 to about 5.0. The value of "n" which is the weighted average valence of M varies from +1 to about +2. The value of "p", which is the average weighted valence of the organic cation has a value from about +1 to about +2. E is an element which is present in the framework and is selected from the group consisting of gallium, iron, boron, chromium, indium and mixtures thereof. The value of "x" which is the mole fraction of E varies from 0 to about 1.0. The ratio of silicon to (Al+E) is represented by "y" which varies from greater than about 3 to about 25, while the mole ratio of O to (Al+E) is represented by "z" and has a value given by the equation:

$$z=(m\cdot n+r\cdot p+3+4\cdot y)/2.$$

When M is only one metal, then the weighted average valence is the valence of that one metal, i.e. +1 or +2. However, when more than one M metal is present, the total amount of:

$$M_m^{n+} = M_{m1}^{(n1)+} + M_{m2}^{(n2)+} + M_{m3}^{(n3)+} + \ldots$$

and the weighted average valence "n" is given by the equation:

$$n = \frac{m_1 \cdot n_1 + m_2 \cdot n_2 + m_3 \cdot n_3 + \ldots}{m_1 + m_2 + m_3 \ldots}$$

Similarly when only one R organic cation is present, the weighted average valence is the valence of the single R cation, i.e., +1 or +2. When more than one R cation is present, the total amount of R is given by the equation:

$$R_r^{p+} = R_{r1}^{(p1)+} + R_{r2}^{(p2)+} + R_{r3}^{(p3)+}$$

and the weighted average valence "p" is given by the equation:

$$p = \frac{p_1 \cdot r_1 + p_2 \cdot r_2 + p_3 \cdot r_3 + \ldots}{r_1 + r_2 + r_3 + \ldots}.$$

These aluminosilicate zeolites, are prepared by a hydrothermal crystallization of a reaction mixture prepared by combining reactive sources of R, aluminum, optionally E and/or M and silicon in aqueous media. Accordingly, the aluminum sources include, but are not limited to, aluminum alkoxides, precipitated alumina, aluminum hydroxide, aluminum salts and aluminum metal. Specific examples of aluminum alkoxides include, but are not limited to aluminum orthosec-butoxide, and aluminum orthoisopropoxide. Sources of silica include but are not limited to tetraethylorthosilicate, fumed silicas, precipitated silicas and colloidal silica. A preferred source of silica is Ultrasil VN SP (89% $SiO_2$). Sources of the M metals include but are not limited to the halide salts, nitrate salts, acetate salts, and hydroxides of the respective alkali or alkaline earth metals. In particular, M metals may occur in impurities in some organoammonium hydroxide sources as well as in some silica sources. For instance, Ludox AS-40 colloidal silica can contain on the order of 0.05% Na while Benzyltrimethylammoniumhydroxide from Aldrich Chemical Company is contaminated with on the order of 0.5% K. Sources of the E elements include but are not limited to alkali borates, boric acid, precipitated gallium oxyhydroxide, gallium sulfate, ferric sulfate, ferric chloride, chromium chloride, chromium nitrate, indium chloride and indium nitrate. As stated when R is Benzyltrimethylammonium the sources include but are not limited to the hydroxide, chloride, bromide, iodide, and fluoride compounds. R may also be a combination of benzyltrimethylammonium and at least one other organoammonium compound. In the case where R is a quaternary ammonium cation or a quaternized alkanolammonium cation, the sources can be the hydroxide, chloride, bromide, iodide and fluoride compounds. Specific examples include without limitation diethyldimethylammonium hydroxide, tetraethylammonium hydroxide, hexamethonium bromide, tetramethylammonium chloride, methyltriethylammonium hydroxide. The source of R may also be neutral amines, diamines, and alkanolamines. Specific examples are triethanolamine, triethylamine, and N,N,N', N'tetramethyl-1,6hexanediamine. In a special case, a reagent in the form of an aluminosilicate stock solution may be used. These solutions consist of one or more organoammonium hydroxides and sources of silicon and aluminum that are processed to form a clear homogenous solution that is generally stored and used as a reagent. The reagent contains aluminosilicate species that typically don't show up in zeolite reaction mixtures derived from separate sources of silicon and aluminum. The reagent is generally alkali-free or contains alkali at impurity levels from the silicon, aluminum, and organoammonium hydroxide sources. One or more of these solutions may be used in a zeolite synthesis. In the case of substitution of Al by E, the corresponding metallosilicate solution may also be employed in a synthesis.

The reaction mixture containing reactive sources of the desired components can be described in terms of molar ratios of the oxides by the formula:

$$aM_{2/n}O:bR_{2/p}O:(1-c)Al_2O_3:cE_2O_3:dSiO_2:eH_2O$$

where "a" is the mole ratio of the oxide of M and has a value of 0 to about 5, "b" is the mole ratio of the oxide of R and has a value of about 1 to about 120, "d" is the mole ratio of silica and has a value of about 5 to about 100, "c" is the mole ratio of the oxide of E and has a value from 0 to about 1.0, and "e" is the mole ratio of water and has a value of about 50 to about 15000. The reaction mixture is now reacted at reaction conditions including a temperature of about 80° C. to about 160° C. and preferably from about 95° C. to about 125° C. for a period of about 2 days to about 30 days and preferably for a time of about 5 days to about 15 days in a sealed reaction vessel under autogenous pressure. After crystallization is complete, the solid product is isolated from the heterogeneous mixture by means such as filtration or centrifugation, and then washed with de-ionized water and dried in air at ambient temperature up to about 100° C.

The crystalline zeolites are characterized by a three-dimensional framework structure of at least $SiO_2$ and $AlO_2$ tetrahedral units. These zeolites are further characterized by their x-ray diffraction pattern. The x-ray diffraction pattern has at least the diffraction lines with the d-spacings and relative intensities listed in Table A.

TABLE A

| 2-θ | d (Å) | I/I₀ % |
|---|---|---|
| 3.86–4.22 | 22.87–20.92 | w–m |
| 7.60–7.84 | 11.62–11.27 | s–vs |
| 11.58–11.86 | 7.64–7.46 | w–m |

TABLE A-continued

| 2-θ | d (Å) | I/I₀ % |
|---|---|---|
| 13.29–13.54 | 6.65–6.53 | m |
| 13.90–14.20 | 6.36–6.23 | w |
| 15.34–15.68 | 5.77–5.65 | m |
| 19.30–19.65 | 4.60–4.51 | m |
| 20.37–20.73 | 4.35–4.28 | m–s |
| 23.18–23.54 | 3.83–3.78 | m–s |
| 23.57–23.89 | 3.77–3.72 | s–vs |
| 24.68–25.03 | 3.60–3.55 | m–s |
| 26.84–27.23 | 3.32–3.27 | m |
| 28.15–28.58 | 3.17–3.12 | m |
| 31.25–31.71 | 2.86–2.82 | vs |
| 33.37–33.76 | 2.68–2.65 | w |
| 35.89–36.36 | 2.50–2.47 | m |
| 48.05–48.52 | 1.89–1.87 | w–m |
| 51.38–51.90 | 1.78–1.76 | w–m |
| 55.35–56.04 | 1.66–1.64 | w–m |
| 58.08–58.64 | 1.59–1.57 | w |

As-synthesized, the zeolites will contain some of the exchangeable or charge balancing cations in its pores. These exchangeable cations can be exchanged for other cations, or in the case of organic cations, they can be removed by heating under controlled conditions. Ion exchange involves contacting the zeolites with a solution containing the desired cation (at molar excess) at exchange conditions. Exchange conditions include a temperature of about 15° C. to about 100° C. and a time of about 20 minutes to about 50 hours. Calcination conditions include a temperature of about 300° C. to about 600° C. for a time of about 2 to about 24 hours.

A special treatment for removing organic cations which provides the ammonium form of the zeolite is ammonia calcination. Calcination in an ammonia atmosphere can decompose organic cations, presumably to a proton form that can be neutralized by ammonia to form the ammonium cation. The resulting ammonium form of the zeolite can be further ion-exchanged to any other desired form. Ammonia calcination conditions include treatment in the ammonia atmosphere at temperatures between about 250° C. and about 600° C. and more preferably between about 250° C. and about 450° C. for times of 10 minutes to 5 hours. Optionally, the treatments can be carried out in multiple steps within this temperature range such that the total time in the ammonia atmosphere does not exceed 5 hours. Above 500° C., the treatments should be brief, less than a half hour and more preferably on the order of 5–10 minutes. Extended calcination times above 500° C. can lead to unintended dealumination along with the desired ammonium ion-exchange and are unnecessarily harsh as most organoammonium templates easily decompose at lower temperatures.

The ion exchanged form of UZM-16 can be described by the empirical formula:

   (2)

where R, x, y, and E are as described above and m' has a value from 0 to about 5.75, M' is a cation selected from the group consisting of alkali metals, alkaline earth metals, rare earth metals, hydrogen ion, ammonium ion, and mixtures thereof, n' is the weighted average valence of M' and varies from about 1 to about 3, r' has a value from 0 to about 5.75, r'+m'>0, and p is the weighted average valence of R and varies from about +1 to +2. The value of z' is given by the formula:

$$z'=(m'\cdot n'+r'\cdot p+3+4\cdot y)/2.$$

The UZM-16 zeolites represented by equation (2) can be further treated in order to remove aluminum and optionally insert silicon thereby increasing the Si/Al ratio and thus modifying the acidity and ion exchange properties of the zeolites. These treatments include: a) contacting with a fluorosilicate solution or slurry; b) calcining or steaming followed by acid extraction or ion-exchange; c) acid extraction or d) any combination of these treatments in any order.

Fluorosilicate treatment is known in the art and is described in U.S. Pat. No. 6,200,463 B1, which cites U.S. Pat. No. 4,711,770 as describing a process for treating a zeolite with a fluorosilicate salt. Both patents are incorporated by reference in their entirety. General conditions for this treatment are contacting the zeolite with a solution containing a fluorosilicate salt such as ammonium fluorosilicate (AFS) at a temperature of about 20° C. to about 90° C.

The acids which can be used in carrying out acid extraction include without limitation mineral acids, carboxylic acids and mixtures thereof. Examples of these include sulfuric acid, nitric acid, ethylenediaminetetraacetic acid (EDTA), citric acid, oxalic acid, etc. The concentration of acid which can be used is not critical but is conveniently between about 1 wt. % to about 80 wt. % acid and preferably between 5 wt. % and 40 wt. % acid. Acid extraction conditions include a temperature of about 10° C. to about 100° C. for a time of about 10 minutes to about 24 hours. Once treated with the acid, the treated UZM-16 zeolite is isolated by means such as filtration, washed with deionized water and dried at ambient temperature up to about 100° C. The UZM-16 zeolites which have undergone one or more treatments whereby aluminum has been removed and optionally silicon has been inserted into the framework will hereinafter be referred to as UZM-16HS.

The extent of dealumination obtained from acid extraction depends on the cation form of the starting UZM-16 as well as the acid concentration and the time and temperature over which the extraction is conducted. For example, if organic cations are present in the starting UZM-16, the extent of dealumination will be slight compared to a UZM-16 in which the organic cations have been removed. This may be preferred if it is desired to have dealumination just at the surface of the UZM-16. As stated above, convenient ways of removing the organic cations include calcination, ammonia calcination, steaming and ion exchange. Calcination, ammonia calcination and ion exchange conditions are as set forth above. Steaming conditions include a temperature of about 400° C. to about 850° C. with from about 1% to about 100% steam for a time of about 10 minutes to about 48 hours and preferably a temperature of about 500° C. to about 600° C., steam concentration of about 5 to about 50% and a time of about 1 to about 2 hours.

It should be pointed out that both calcination and steaming treatments not only remove organic cations, but can also dealuminate the zeolite. Thus, alternate embodiments for dealumination include: a calcination treatment followed by acid extraction and steaming followed by acid extraction. A further embodiment for dealumination comprises calcining or steaming the starting UZM-16 zeolite followed by an ion-exchange treatment. Of course an acid extraction can be carried out concurrently with, before or after the ion exchange.

The ion exchange conditions are the same as set forth above, namely a temperature of about 15° C. to about 100° C. and a time of about 20 minutes to about 50 hours. Ion exchange can be carried out with a solution comprising a cation (M1') selected from the group consisting of alkali metals, alkaline earth metals, rare earth metals, hydrogen ion, ammonium ion, and mixtures thereof. By carrying out this ion exchange, the M1 cation is exchanged for a secondary or different M1' cation. In a preferred embodiment, the UZM-16HS composition after the steaming or calcining steps is contacted with an ion exchange solution comprising an ammonium salt. Examples of ammonium salts include but are not limited to ammonium nitrate, ammonium chloride, ammonium bromide, and ammonium acetate. The ammonium ion containing solution can optionally contain a mineral acid such as but not limited to nitric, hydrochloric, sulfuric and mixtures thereof. The concentration of the mineral acid is that amount necessary to give a ratio of $H^+$ to $NH_4^+$ of 0 to 1. This ammonium ion exchange aids in removing any debris present in the pores after the steaming and/or calcination treatments.

It is apparent from the foregoing that, with respect to effective process conditions, it is desirable that the integrity of the zeolite crystal structure be substantially maintained throughout the dealumination process, and that the zeolite retains at least 50%, preferably at least 70% and more preferably at least 90% of its original crystallinity. A convenient technique for assessing the crystallinity of the products relative to the crystallinity of the starting material is the comparison of the relative intensities of the d-spacing of their respective X-ray powder diffraction patterns. The sum of the peak intensities, in arbitrary units above the background, of the starting material is used as the standard and is compared with the corresponding peak intensities of the products. When, for example, the numerical sum of the peak heights of the molecular sieve product is 85 percent of the value of the sum of the peak intensities of the starting zeolite, then 85 percent of the crystallinity has been retained. In practice it is common to utilize only a portion of the peaks for this purpose, as for example, five or six of the strongest peaks. Other indications of the retention of crystallinity are surface area and adsorption capacity. These tests may be preferred when the substituted metal significantly changes, e.g., increases, the absorption of x-rays by the sample or when peaks experience substantial shifts such as in the dealumination process.

After having undergone any of the dealumination treatments as described above, the UZM-16HS is usually dried and can be used in various processes as discussed below. Applicants have found the properties of the UZM-16HS can be further modified by one or more additional treatment. These treatments include steaming, calcining or ion exchanging and can be carried out individually or in any combination. Some of these combinations include but are not limited to:

| | | |
|---|---|---|
| steam → | calcine → | ion exchange; |
| calcine → | steam → | ion exchange; |
| ion exchange → | calcine → | steam |
| ion exchange → | steam → | calcine; |
| | steam → calcine; | |

The dealumination treatment described above can be combined in any order to provide the zeolites of the invention although not necessarily with equivalent result. It should be pointed out that the particular sequence of treatments, e.g., AFS, acid extraction, steaming, calcining, etc can be repeated as many times as necessary to obtain the desired properties. Of course one treatment can be repeated while not repeating other treatments, e.g., repeating the AFS two or more times before carrying out steaming or calcining;

etc. Finally, the sequence and/or repetition of treatments will determine the properties of the final UZM-16HS composition.

The UZM-16HS as prepared above is described by the empirical formula on an anhydrous basis of

$$M1_a^{n+}Al_{(1-x)}E_xSi_{y'}O_{z''} \qquad (3)$$

where M1 is at least one exchangeable cation selected from the group consisting of alkali, alkaline earth metals, rare earth metals, ammonium ion, hydrogen ion and mixtures thereof, a is the mole ratio of M1 to (Al+E) and varies from about 0.01 to about 50, n is the weighted average valence of M1 and has a value of about +1 to about +3, E is an element selected from the group consisting of gallium, iron, boron, chromium, indium and mixtures thereof, x is the mole fraction of E and varies from 0 to 1.0, y' is the mole ratio of Si to (Al+E) and varies from greater than about 3 to virtually (pure silica) and z" is the mole ratio of O to (Al+E) and has a value determined by the equation:

$$z''=(a \cdot n+3+4 \cdot y')/2;$$

the zeolite characterized in that it has an x-ray diffraction pattern having at least the d-spacings and relative intensities set forth in Table B.

TABLE B

| 2-θ | d (Å) | $I/I_o$ % |
|---|---|---|
| 7.70–8.40 | 11.47–10.52 | m–vs |
| 11.70–12.10 | 7.56–7.31 | w |
| 13.35–14.56 | 6.63–6.08 | s–vs |
| 20.60–21.70 | 4.31–4.09 | w |
| 24.60–25.65 | 3.62–3.47 | m–s |

By virtually pure silica is meant that virtually all the aluminum and/or the E metals have been removed from the framework. It is well know that it is virtually impossible to remove all the aluminum and/or E metal. Numerically, a zeolite is virtually pure silica when y' has a value of at least 3,000, preferably 10,000 and most preferably 20,000. Thus, ranges for y' are from 3 to 3,000 preferably greater than 10 to about 3,000; 3 to 10,000 preferably greater than 10 to about 10,000 and 3 to 20,000 preferably greater than 10 to about 20,000.

In specifying the proportions of the zeolite starting material or adsorption properties of the zeolite product and the like herein, the "anhydrous state" of the zeolite will be intended unless otherwise stated. The term "anhydrous state" is employed herein to refer to a zeolite substantially devoid of both physically adsorbed and chemically adsorbed water.

The zeolites of this invention (both UZM-16 and UZM-16HS) are capable of separating mixtures of molecular species based on the molecular size (kinetic diameter) or on the degree of polarity of the molecular species. When the separation of molecular species is based on molecular size, separation is accomplished by the smaller molecular species entering the intracrystalline void space while excluding larger species. The kinetic diameters of various molecules such as oxygen, nitrogen, carbon dioxide, carbon monoxide are provided in D. W. Breck, Zeolite Molecular Sieves, John Wiley and Sons (1974) p. 636.

The crystalline microporous compositions of the present invention (both UZM-16 and UZM-16HS) either as-synthesized, after calcination or after any of the above referenced treatments can be used as catalysts or catalyst supports in hydrocarbon conversion processes. Hydrocarbon conversion processes are well known in the art and include ring-opening, cracking, hydrocracking, alkylation of both aromatics and isoparaffins, isomerization, polymerization, reforming, dewaxing, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. Nos. 4,310,440 and 4,440,871 which are incorporated by reference. A preferred hydrocarbon conversion process is ring-opening, whereby cyclic hydrocarbons are converted to non-cyclic hydrocarbons, i.e. linear or branched hydrocarbons.

Other reactions may be catalyzed by these crystalline microporous compositions, including base-catalyzed side chain alkylation of alkylaromatics, aldol-condensations, olefin double bond isomerization and isomerization of acetylenes, alcohol dehydrogenation, and olefin dimerization, oligomerization and conversion of alcohol to olefins. Suitably ion exchanged forms of these materials can catalyze the reduction of $NO_x$ to $N_2$ in automotive and industrial exhaust streams. Some of the reaction conditions and types of feeds that can be used in these processes are set forth in U.S. Pat. No. 5,015,796 and in H. Pines, THE CHEMISTRY OF CATALYTIC HYDROCARBON CONVERSIONS, Academic Press (1981) pp. 123–154 and references contained therein, which are incorporated by reference.

The X-ray patterns presented in the following examples (and tables above) were obtained using standard X-ray powder diffraction techniques. The radiation source was a high-intensity. X-ray tube operated at 45 kV and 35 ma. The diffraction pattern from the copper K-alpha radiation was obtained by appropriate computer based techniques. Flat compressed powder samples were continuously scanned at 2° (2θ) per minute from 2° to 70°(2θ). Interplanar spacings (d) in Angstrom units were obtained from the position of the diffraction peaks expressed as 2θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4 on each reported value of 2θ and up to ±0.5 on reported values for nanocrystalline materials. This uncertainty is, of course, also manifested in the reported values of the d-spacings, which are calculated from the θ values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m and w which represent very strong, strong, medium, and weak, respectively. In terms of $100 \times I/I_o$, the above designations are defined as w=0–15; m=15–60; s=60–80 and vs=80–100. In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

EXAMPLE 1

An aluminosilicate reaction mixture was prepared by adding 2.33 g of Al(Osec-Bu)$_3$ (95+%) to 63.35 g BzT-MAOH (40%) with vigorous stirring, followed by the addition of 28 g of colloidal silica (LUDOX™ AS-40, 40% $SiO_2$). Next 6 g of water was added slowly to the aluminosilicate reaction mixture with continued mixing. The mixture was homogenized for an additional 30 minutes with a high-speed stirrer and distributed to three teflon-lined autoclaves which were placed in a 125° C. oven and the mixtures digested for 3, 6, and 10 days at autogenous pressures. The solid products were isolated by filtration, washed with deionized water, and dried at 95° C.

The products from all three of the reactions exhibited an x-ray diffraction pattern for the zeolite designated UZM-16. Representative diffraction lines from the 3-day sample are shown in Table 1 below. The BET surface area of the calcined material determined from $N_2$ adsorption was 523 m$^2$/g and the micropore volume was 0.26 cc/g.

TABLE 1

| 2-θ | d (Å) | I/I$_o$ % |
|---|---|---|
| 4.10 | 21.49 | m |
| 7.68 | 11.50 | s |
| 11.66 | 7.58 | w |
| 13.38 | 6.61 | m |
| 14.00 | 6.32 | w |
| 15.48 | 5.72 | m |
| 19.46 | 4.56 | m |
| 20.56 | 4.32 | s |
| 23.36 | 3.80 | s |
| 23.72 | 3.75 | vs |
| 24.80 | 3.59 | s |
| 27.02 | 3.30 | m |
| 28.32 | 3.15 | m |
| 30.65 | 2.91 | w |
| 31.42 | 2.84 | vs |
| 33.52 | 2.67 | w |
| 36.08 | 2.49 | m |
| 41.00 | 2.20 | w |
| 42.92 | 2.11 | w |
| 43.68 | 2.07 | w |
| 45.92 | 1.97 | w |
| 48.28 | 1.88 | m |
| 49.86 | 1.83 | w |
| 51.62 | 1.77 | w |
| 54.14 | 1.69 | w |
| 55.90 | 1.64 | m |
| 58.42 | 1.58 | w |
| 61.69 | 1.50 | w |
| 63.76 | 1.46 | w |
| 65.40 | 1.43 | w |
| 69.00 | 1.36 | w |

Figure 1B:
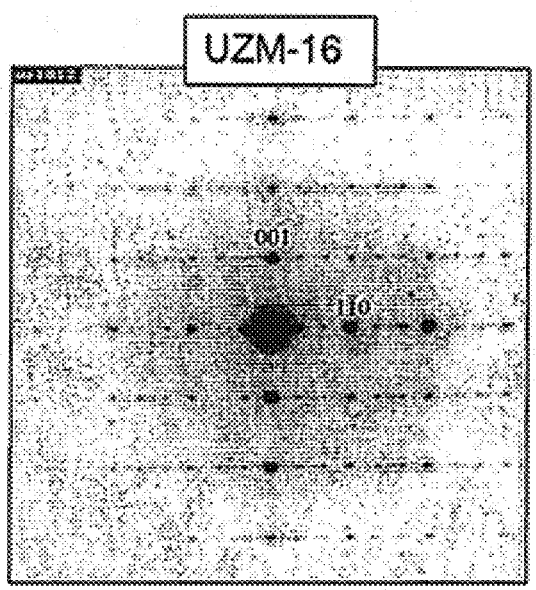

The distinction of UZM-16 from the offretite structure is further distinguished by electron diffraction. FIG. 1 shows a comparison of UZM-16 (FIG. 1B) and offretite (FIG. 1A) electron diffraction patterns taken along [110], shown with the (001) and the (1$\bar{1}$0) directions in the plane as indicated. It is clear that the periodicity in the (1$\bar{1}$0) direction in UZM-16 is different from that of offretite and that the spacing is larger by a factor of 3. The electron diffraction pattern for offretite presented here is consistent with those shown in the literature for the same orientation (J. V Sanders, M. L. Occelli, R. A. Innes, and S. S. Pollack, Studies in Surface Science and Catalysis, Ed. Y. Murakami, A. Iijima, and J. W. Ward, Elsevier, New York, 28, 429, (1986)).

Figure 2:
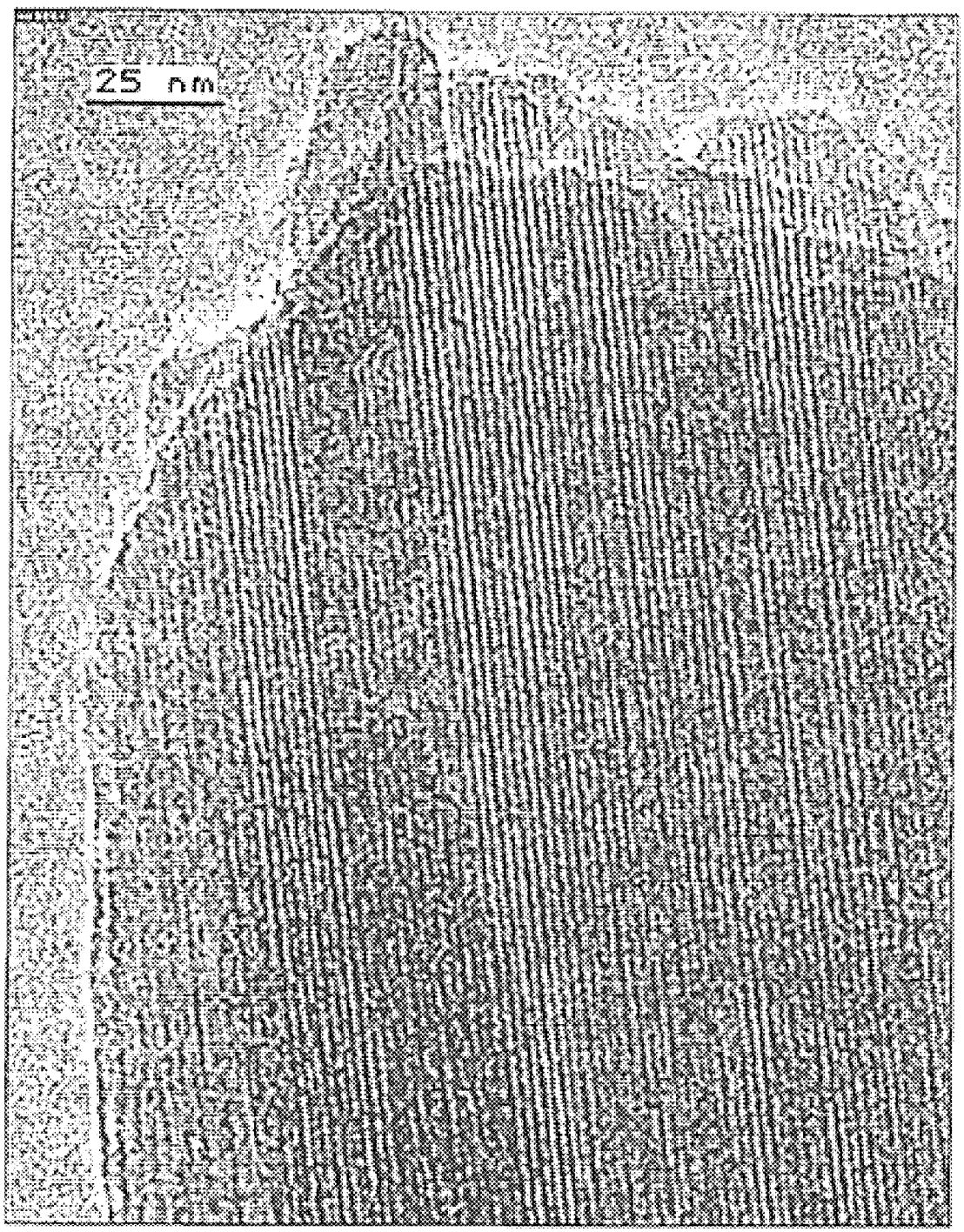
FIG. 2 is a lattice image obtained by High Resolution Electron Microscopy of UZM-16 from example 1.

The larger spacing is easily observed in the lattice images of UZM-16. FIG. 2 shows the lattice image of UZM-16 taken along [110]. The lattice fringes running vertically in the image correspond to the 19.3 Å species indicated by the reflection at 1/3(1$\bar{1}$0) in FIG. 1b. This spacing is triple that for the (1$\bar{1}$0) expected in OFF, which would be about 6.65 Å.

EXAMPLE 2

This example demonstrates the preparation of UZM-16, its modification by calcination, ion-exchange and steaming to form UZM-16HS, followed by an additional modification by acid extraction to form yet another variant of UZM-16HS. An aluminosilicate reaction mixture was prepared by adding 35.21 g of Al(Osec-Bu)$_3$ (95+%) to 927.47 g BzT-MAOH (40%) with vigorous stirring. After the aluminum reagent was dissolved, 416.45 g colloidal silica (LUDOX AS-40, 40% SiO$_2$) was added and the resulting mixture was homogenized for 30 minutes with a high-speed stirrer. The mixture was crystallized at 125° C. for 6 days in a 2-L PARR™ stirred reactor at autogenous pressure. The solid products were isolated by filtration, washed with de-ionized water, and dried at 95° C. Powder x-ray diffraction identified the product as UZM-16. Diffraction lines characteristic of the pattern are given in Table 2 below. Elemental analysis showed this parent UZM-16 material to have a Si/Al ratio of 5.83. A 62.5 g portion of the UZM-16 was initially calcined in a flowing nitrogen atmosphere ramping to 250° C. at 1° C./min, dwelling at 250° C. for 2 hr, ramping to 500° C. at 1° C./min, dwelling at 500° C. for 3 hr, switching the atmosphere to flowing air, and dwelling for an additional 3 hr at 500° C. The BET surface area of the calcined material was 676 m$^2$/g and the micropore volume was 0.33 cc/g. A 51 g portion of the calcined material was ammonium exchanged by suspending it in a solution containing 52 g NH$_4$NO$_3$ dissolved in 500 g de-ionized water. The slurry was heated to 85° C. for 7 hr and then isolated by filtration and washed thoroughly with de-ionized water. The exchange was repeated two more times, but only for 2.5 hr at 85° C.

A 40 g portion of the ammonium exchanged calcined UZM-16 was steamed at 600° C. for 2 hrs with 50% steam using a horizontal steamer. The product was identified as UZM-16HS via powder x-ray diffraction. Characteristic diffraction lines for this product is shown below in Table 2. Nitrogen adsorption measurements yielded a BET surface area of 424 m$^2$/g and a micropore volume of 0.20 cc/g for the steamed ammonium-exchanged calcined UZM-16HS material.

A 20 g portion of the UZM-16HS obtained via steaming was further treated with acid. An acidic solution was prepared by diluting 19.7 g HNO$_3$ (69%) in 350 g de-ionized water. The solution was heated to 90° C. before the addition of the steamed UZM-16. The resulting slurry was stirred for 1 hr at 90° C. The product was isolated by filtration, washed with de-ionized water, and dried at 98° C. The modified product was determined to be UZM-16HS via x-ray powder diffraction analysis. Characteristic diffraction lines for the product are listed in Table 2 below. Elemental analyses of the steamed/acid wash showed the product to have a Si/Al ratio of 14.76.

TABLE 2

| UZM-16 | | | UZM-16HS (steamed ammonium-exchanged calcined UZM-16) | | | UZM-16HS (Acid extracted steamed ammonium-exchanged calcined UZM-16) | | |
|---|---|---|---|---|---|---|---|---|
| 2-θ | d (Å) | I/I$_0$ % | 2-θ | d (Å) | I/I$_0$ % | 2-θ | d (Å) | I/I$_0$ % |
| 4.04 | 21.85 | m | | | | | | |
| 7.72 | 11.44 | vs | 7.94 | 11.13 | vs | 8.18 | 10.80 | m |
| 11.72 | 7.55 | w | 11.86 | 7.46 | w | 11.96 | 7.39 | w |
| 13.40 | 6.60 | m | 13.64 | 6.48 | s | | | |
| 14.04 | 6.30 | w | 14.30 | 6.19 | m | 14.26 | 6.21 | vs |
| 15.52 | 5.71 | m | | | | | | |
| 19.48 | 4.55 | m | | | | 19.18 | 4.62 | w |
| 20.58 | 4.31 | s | 20.98 | 4.23 | w | 21.32 | 4.16 | w |
| 23.38 | 3.80 | m | 23.67 | 3.76 | w | | | |
| 23.76 | 3.74 | vs | 23.98 | 3.71 | w | 24.34 | 3.65 | w |
| 24.86 | 3.58 | s | 25.02 | 3.56 | m | 25.25 | 3.52 | m |
| 27.06 | 3.29 | m | | | | | | |
| 28.34 | 3.15 | m | | | | | | |
| 30.62 | 2.92 | w | | | | | | |
| 31.46 | 2.84 | vs | 31.84 | 2.81 | m | | | |
| 33.56 | 2.67 | w | | | | | | |
| 36.08 | 2.49 | m | | | | | | |
| 41.08 | 2.20 | w | | | | | | |
| 42.92 | 2.11 | w | | | | | | |
| 43.60 | 2.07 | w | | | | | | |
| 45.88 | 1.98 | w | | | | | | |
| 48.26 | 1.88 | m | | | | | | |
| 48.99 | 1.86 | w | | | | | | |
| 49.92 | 1.83 | w | | | | | | |
| 51.64 | 1.77 | m | | | | | | |
| 54.14 | 1.69 | w | | | | | | |
| 55.80 | 1.65 | m | | | | | | |
| 58.40 | 1.58 | w | | | | | | |
| 61.66 | 1.50 | w | | | | | | |
| 63.68 | 1.46 | w | | | | | | |
| 65.52 | 1.42 | w | | | | | | |
| 67.99 | 1.38 | w | | | | | | |
| 68.91 | 1.36 | w | | | | | | |

EXAMPLE 3

An aluminosilicate reaction mixture was prepared by adding 35.21 g of Al(Osec-Bu)$_3$ (95+%) to 927.47 g BzT-MAOH (40%) with vigorous stirring. After the aluminum reagent was dissolved, 416.45 g colloidal silica (LUDOX AS-40, 40% SiO$_2$) was added and the resulting mixture was homogenized for 30 minutes with a high-speed stirrer. The mixture was crystallized at 105° C. for 12 days in a 2-L PARR™ stirred reactor at autogenous pressure. The solid product was isolated by filtration, washed with de-ionized water, and dried at 95° C. Powder x-ray diffraction identified the product as UZM-16. Diffraction lines characteristic of the pattern are given in Table 3 below. Elemental analysis showed this parent UZM-16 composition to have the elemental mole ratio Si/Al=5.7. The product was calcined initially in a nitrogen atmosphere ramping to 350° C. at 1° C./min, dwelling at 350° C. for 1 hr, ramping to 500° C. at 1° C./min, dwelling at 500° C. for 6 hr, switching the atmosphere to air, and dwelling for an additional 6 hr at 500° C. The BET surface area of the calcined material was 574 m$^2$/g and the micropore volume was 0.24 cc/g. A 98 g portion of the calcined product was ammonium exchanged by suspending it in a solution containing 100 g NH$_4$NO$_3$ dissolved in 1000 ml deionized water. The slurry was heated for 5 hr at 80° C., the product isolated by filtration and washed thoroughly with de-ionized water. This exchange was repeated 3 additional times.

An 18 g portion of the ammonium exchanged calcined UZM-16 was steamed at 600° C. for 2 hrs with 50% steam using a horizontal steamer. A 12 g portion of this steamed material was additionally acid extracted. An acidic solution was prepared by diluting 10 g HNO$_3$ (69%) in 300 g de-ionized water. The solution was heated to 90° C. before the addition of the steamed ammonium-exchanged calcined UZM-16. The resulting slurry was stirred for 1 hr at 90° C. The product was isolated by filtration, washed with de-ionized water, and dried at 98° C. The modified product was identified as UZM-16HS via x-ray powder diffraction. Characteristic diffraction lines for the product are listed in Table 3. Elemental analyses showed the final dealuminated product to have a Si/Al ratio of 11.56. Nitrogen adsorption measurements showed the BET surface area to be 466 m$^2$/g, while the micropore volume was 0.19 cc/g.

TABLE 3

| UZM-16 | | | UZM-16HS (acid extracted steamed ammonium-exchanged calcined UZM-16) | | |
|---|---|---|---|---|---|
| 2-θ | d (Å) | I/I$_0$ % | 2-θ | d (Å) | I/I$_0$ % |
| 3.93 | 22.49 | w | | | |
| 7.66 | 11.53 | s | 8.08 | 10.93 | m |
| 11.70 | 7.56 | w | 11.84 | 7.47 | w |
| 13.38 | 6.61 | m | 13.84 | 6.39 | vs |
| 14.00 | 6.32 | w | | | |
| 15.44 | 5.73 | m | | | |
| 19.44 | 4.56 | m | 19.88 | 4.46 | w |
| 20.56 | 4.32 | m | 21.08 | 4.21 | w |
| 23.32 | 3.81 | s | | | |
| 23.76 | 3.74 | s | | | |
| 24.82 | 3.58 | vs | 25.06 | 3.55 | m |
| 27.05 | 3.29 | m | | | |
| 28.32 | 3.15 | m | | | |
| 31.48 | 2.84 | vs | 31.80 | 2.81 | w |
| 33.58 | 2.67 | w | | | |
| 36.22 | 2.48 | w | | | |
| 48.24 | 1.89 | w | | | |
| 49.83 | 1.83 | w | | | |
| 51.64 | 1.77 | m | | | |
| 55.58 | 1.65 | m | | | |
| 58.34 | 1.58 | w | | | |
| 61.58 | 1.50 | w | | | |
| 63.69 | 1.46 | w | | | |
| 65.43 | 1.43 | w | | | |
| 68.02 | 1.38 | w | | | |
| 68.83 | 1.36 | w | | | |

What is claimed is:

1. A microporous crystalline zeolite having a composition in the as-synthesized and anhydrous form in terms of mole ratios of the elements of:

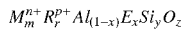

where M is at least one exchangeable cation selected from the group consisting of alkali and alkaline earth metals, "m" is the mole ratio of M to (Al+E) and varies from 0 to about 0.75, R is benzyltrimethylammonium (BzTMA) or a combination of BzTMA and at least one organoammonium cation selected from the group consisting of quaternary ammonium cations, protonated amines, protonated diamines, protonated alkanolamines, diquaternaryammonium cations, quaternized alkanolamines and mixtures thereof, "r" is the mole ratio of R to (Al+E) and has a value of about 0.25 to about 5.0, E is an element selected from the group consisting of Ga, Fe, In, Cr, B, and mixtures thereof, "x" is the mole fraction of E and varies from 0 to about 1.0, "n" is the weighted average valence of M and has a value of about +1 to about +2, "p" is the weighted average valence of R and has a value of +1 to about +2, "y" is the mole ratio of Si to (Al+E) and varies from greater than about 3 to about 25 and "z" is the mole ratio of O to (Al+E) and has a value determined by the equation:

$$z = (m \cdot n + r \cdot p + 3 + 4 \cdot y)/2;$$

the zeolite characterized in that it has an x-ray diffraction pattern having at least the d-spacings and relative intensities set forth in Table A:

TABLE A

| 2-θ | d (Å) | I/I$_0$ % |
|---|---|---|
| 3.86–4.22 | 22.87–20.92 | w–m |
| 7.60–7.84 | 11.62–11.27 | s–vs |
| 11.58–11.86 | 7.64–7.46 | w–m |
| 13.29–13.54 | 6.65–6.53 | m |
| 13.90–14.20 | 6.36–6.23 | w |
| 15.34–15.68 | 5.77–5.65 | m |
| 19.30–19.65 | 4.60–4.51 | m |
| 20.37–20.73 | 4.35–4.28 | m–s |
| 23.18–23.54 | 3.83–3.78 | m–s |
| 23.57–23.89 | 3.77–3.72 | s–vs |
| 24.68–25.03 | 3.60–3.55 | m–s |
| 26.84–27.23 | 3.32–3.27 | m |
| 28.15–28.58 | 3.17–3.12 | m |
| 31.25–31.71 | 2.86–2.82 | vs |
| 33.37–33.76 | 2.68–2.65 | w |
| 35.89–36.36 | 2.50–2.47 | m |
| 48.05–48.52 | 1.89–1.87 | w–m |
| 51.38–51.90 | 1.78–1.76 | w–m |
| 55.35–56.04 | 1.66–1.64 | w–m |
| 58.08–58.64 | 1.59–1.57 | w. |

2. The zeolite of claim 1 where M is selected from the group consisting of sodium, potassium, lithium, strontium, barium and mixtures thereof.

3. The zeolite of claim 1 where "m" is zero.

4. The zeolite of claim 3 where R is a combination of BzTMA and an organoammonium cation selected from the group consisting of diethyldimethylammonium cation, ethyltrimethylammonium cation, tetramethylammonium cation, hexamethonium cation, tetrapropylammonium cation and mixtures thereof.

5. A process for preparing a microporous crystalline zeolite having a composition in the as-synthesized and anhydrous form in terms of mole ratios of the elements given by

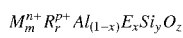

where M is at least one exchangeable cation selected from the group consisting of alkali and alkaline earth metals, "m" is the mole ratio of M to (Al+E) and varies from 0 to about 0.75, R is benzyltrimethylammonium (BzTMA) or a combination of BzTMA and at least one organoammonium cation selected from the group consisting of quaternary ammonium cations, protonated amines, protonated diamines, protonated alkanolamines, diquaternaryammonium cations, quaternized alkanolamines and mixtures thereof, "r" is the mole ratio of R to (Al+E) and has a value of about 0.25 to about 5.0, E is an element selected from the group consisting of Ga, Fe, In, Cr, B, and mixtures thereof "x" is the mole fraction of E and varies from 0 to about 1.0, "n" is the weighted average valence of M and has a value of about +1 to about +2, "p" is the weighted average valence of R and has a value of +1 to about +2, "y" is the mole ratio of Si to (Al+E) and varies from greater than 3 to about 25 and "z" is the mole ratio of O to (Al+E) and has a value determined by the equation:

$$z=(m \cdot n+r \cdot p+3+4 \cdot y)/2;$$

the zeolite characterized in that it has an x-ray diffraction pattern having at least the d-spacings and relative intensities set forth in Table A:

TABLE A

| 2-θ | d (Å) | I/I₀ % |
|---|---|---|
| 3.86–4.22 | 22.87–20.92 | w–m |
| 7.60–7.84 | 11.62–11.27 | s–vs |
| 11.58–11.86 | 7.64–7.46 | w–m |
| 13.29–13.54 | 6.65–6.53 | m |
| 13.90–14.20 | 6.36–6.23 | w |
| 15.34–15.68 | 5.77–5.65 | m |
| 19.30–19.65 | 4.60–4.51 | m |
| 20.37–20.73 | 4.35–4.28 | m–s |
| 23.18–23.54 | 3.83–3.78 | m–s |
| 23.57–23.89 | 3.77–3.72 | s–vs |
| 24.68–25.03 | 3.60–3.55 | m–s |
| 26.84–27.23 | 3.32–3.27 | m |
| 28.15–28.58 | 3.17–3.12 | m |
| 31.25–31.71 | 2.86–2.82 | vs |
| 33.37–33.76 | 2.68–2.65 | w |
| 35.89–36.36 | 2.50–2.47 | m |
| 48.05–48.52 | 1.89–1.87 | w–m |
| 51.38–51.90 | 1.78–1.76 | w–m |
| 55.35–56.04 | 1.66–1.64 | w–m |
| 58.08–58.64 | 1.59–1.57 | w | the process comprising forming a reaction mixture containing reactive sources of R, Al, Si and optionally E and/or M and heating the reaction mixture at a temperature of about 80° C. to about 160° C., the reaction mixture having a composition expressed in terms of mole ratios of the oxides of:

$$aM_{2/n}O:bR_{2/p}O:(1-c)Al_2O_3:cE_2O_3:dSiO_2:eH_2O$$

where "a" has a value of 0 to about 5.0, "b" has a value of about 1 to about 120, "c" has a value of 0 to about 1.0, "d" has a value of 5 to about 100, and "e" has a value of about 50 to about 15000.

6. The process of claim 5 where M is selected from the group consisting of potassium, lithium, sodium, cesium, strontium, barium and mixtures thereof.

7. The process of claim 5 where the source of M is selected from the group consisting of halide, nitrate, sulfate, hydroxide, or acetate compounds.

8. The process of claim 5 where R is a combination of BzTMA and an organoammonium cation selected from the group consisting of diethyldimethylammonium, ethyltrimethylammonium, tetramethylammonium, tetraethylammonium, hexamethonium, tetrapropylammonium and mixtures thereof.

9. The process of claim 5 where the source of R is the halide or hydroxide compounds of R.

10. The process of claim 5 where the aluminum source is selected from the group consisting of aluminum isopropoxide, aluminum sec-butoxide, precipitated alumina and aluminum metal.

11. The process of claim 5 where the silicon source is selected from the group consisting of tetraethylorthosilicate, colloidal silica, fumed silica and precipitated silica.

12. The process of claim 5 where the E source is selected from the group consisting of alkali borates, boric acid, gallium oxyhydroxide, gallium sulfate, ferric sulfate, ferric chloride, chromium nitrate, indium chloride and mixtures thereof.

13. A hydrocarbon conversion process comprising contacting a hydrocarbon with a catalytic composite at hydrocarbon conversion conditions to give a converted product, the catalytic composite comprising a microporous crystalline zeolite selected from the group consisting of UZM-16, UZM-16HS and mixtures thereof wherein UZM-16 has a composition in the as-synthesized and anhydrous form in terms of mole ratios of the elements given by $$M_m^{n+}R_r^{p+}Al_{(1-x)}E_xSi_yO_z$$

where M is at least one exchangeable cation selected from the group consisting of alkali and alkaline earth metals, "m" is the mole ratio of M to (Al+E) and varies from 0 to about 0.75, R is benzyltrimethylammonium (BzTMA) cation or a combination of BzTMA and at least one organoammonium cation selected from the group consisting of quaternary ammonium cations, protonated amines, protonated diamines, protonated alkanolamines, diquaternaryammonium cations, quaternized alkanolamines and mixtures thereof, "r" is the mole ratio of R to (Al+E) and has a value of about 0.25 to about 5.0, E is an element selected from the group consisting of Ga, Fe, In, Cr, B, and mixtures thereof "x" is the mole fraction of E and varies from 0 to about 1.0, "n" is the weighted average valence of M and has a value of about +1 to about +2, "p" is the weighted average valence of R and has a value of +1 to about +2, "y" is the mole ratio of Si to (Al+E) and varies from greater than 3 to about 25 and "z" is the mole ratio of O to (Al+E) and has a value determined by the equation:

$$z=(m \cdot n+r \cdot p+3+4 \cdot y)/2;$$

the zeolite characterized in that it has an x-ray diffraction pattern having at least the d-spacings and relative intensities set forth in Table A:

TABLE A

| 2-θ | d (Å) | I/I₀ % |
|---|---|---|
| 3.86–4.22 | 22.87–20.92 | w–m |
| 7.60–7.84 | 11.62–11.27 | s–vs |
| 11.58–11.86 | 7.64–7.46 | w–m |
| 13.29–13.54 | 6.65–6.53 | m |
| 13.90–14.20 | 6.36–6.23 | w |
| 15.34–15.68 | 5.77–5.65 | m |
| 19.30–19.65 | 4.60–4.51 | m |
| 20.37–20.73 | 4.35–4.28 | m–s |
| 23.18–23.54 | 3.83–3.78 | m–s |
| 23.57–23.89 | 3.77–3.72 | s–vs |
| 24.68–25.03 | 3.60–3.55 | m–s |
| 26.84–27.23 | 3.32–3.27 | m |
| 28.15–28.58 | 3.17–3.12 | m |
| 31.25–31.71 | 2.86–2.82 | vs |
| 33.37–33.76 | 2.68–2.65 | w |
| 35.89–36.36 | 2.50–2.47 | m |
| 48.05–48.52 | 1.89–1.87 | w–m |
| 51.38–51.9 | 1.78–1.76 | w–m |
| 55.35–56.04 | 1.66–1.64 | w–m |
| 58.08–58.64 | 1.59–1.57 | w | and UZM-16HS has an empirical composition on an anhydrous basis in terms of mole ratios of the elements of:

$$M1_a^{n+}Al_{(1-x)}E_xSi_{y'}O_z$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0.01 to about 50, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 3 and z" is the mole ratio of O to (Al+E) and has a value determined by the equation:

$$z"=(a \cdot n+3+4 \cdot y')/2;$$

the zeolite characterized in that it has an x-ray diffraction pattern having at least the d-spacings and relative intensities set forth in Table B:

TABLE B

| 2-θ | d (Å) | I/I$_0$ % |
|---|---|---|
| 7.70–8.40 | 11.47–10.52 | m–vs |
| 11.70–12.10 | 7.56–7.31 | w |
| 13.35–14.56 | 6.63–6.08 | s–vs |
| 20.60–21.70 | 4.31–4.09 | w |
| 24.60–25.65 | 3.62–3.47 | m–s. |

14. A microporous crystalline zeolite having an empirical composition on an anhydrous basis in terms of mole ratios of the elements of:

$$MI^{n+}_a Al_{(1-x)} E_x Si_{y'} O_{z"}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from 0.01 to about 50, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 3 and z" is the mole ratio of O to (Al+E) and has a value determined by the equation:

$$z"=(a \cdot n+3+4 \cdot y')/2$$

the zeolite characterized in that it has an x-ray diffraction pattern having at least the d-spacings and relative intensities set forth in Table B:

TABLE B

| 2-θ | d (Å) | I/I$_0$ % |
|---|---|---|
| 7.70–8.40 | 11.47–10.52 | m–vs |
| 11.70–12.10 | 7.56–7.31 | w |
| 13.35–14.56 | 6.63–6.08 | s–vs |
| 20.60–21.70 | 4.31–4.09 | w |
| 24.60–25.65 | 3.62–3.47 | m–s. |

15. The zeolite of claim 14 where M1 is selected from the group consisting of lithium, cesium, sodium, potassium, strontium, barium, calcium, lanthanum, and magnesium.

16. The zeolite of claim 14 where M1 is a hydrogen ion.

17. The zeolite of claim 14 where y' has a value from about 3 to about 20,000.

18. The zeolite of claim 17 where y' has a value from about 6 to about 3,000.

19. A process for preparing a modified microporous crystalline zeolite having an empirical composition on an anhydrous basis in terms of mole ratios of the elements of:

$$MI^{n+}_a Al_{(1-x)} E_x Si_{y'} O_z$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0.01 to about 50, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 3 and z" is the mole ratio of O to (Al+E) and has a value determined by the equation:

$$z"=(a \cdot n+3+4 \cdot y')/2$$

the zeolite characterized in that it has an x-ray diffraction pattern having at least the d-spacings and relative intensities set forth in Table B:

TABLE B

| 2-θ | d (Å) | I/I$_0$ % |
|---|---|---|
| 7.70–8.40 | 11.47–10.52 | m–vs |
| 11.70–12.10 | 7.56–7.31 | w |
| 13.35–14.56 | 6.63–6.08 | s–vs |
| 20.60–21.70 | 4.31–4.09 | w |
| 24.60–25.65 | 3.62–3.47 | m–s | the process comprising treating a starting zeolite at treating conditions thereby removing at least a portion of the framework aluminum and optionally inserting silicon into the framework to provide the modified zeolite; the starting zeolite having an empirical formula on an anhydrous basis of:

$$M^{n+}_{m'} R^{p+}_{r'} Al_{(1-x)} E_x Si_{y'} O_{z'}$$

where M' is an exchangeable cation selected from the group consisting of ammonium ion, hydrogen ion, alkali metals, alkaline earth metals, rare earth metals and mixtures thereof, n is the weighted average valence of M' and varies from +1 to about +3, m' is the mole ratio of M' to (Al+E) and varies from 0 to about 5.75, R is benzyltrimethylammonium (BzTMA) or a combination of BzTMA and at least one organoammonium cation selected from the group consisting of protonated amines, protonated diamines, protonated alkanolamines, quaternary ammonium ions, diquarternary ammonium ions, quaternized alkanolammonium ions and mixtures thereof, p is the average weighted valence of the organic cation and varies from about +1 to about +2, r' is the mole ratio of R to (Al+E) and varies from 0 to about 5.75, r'+m'>0, y' is the ratio of Si to (Al+E) and varies from greater than 3 to about 25 and z' is the mole ratio of O to (Al+E) and has a value given by the equation:

$$z'=(m' \cdot n+r' \cdot p+3+4 \cdot y')/2.$$

the zeolite characterized in that it has an x-ray diffraction pattern having at least the d-spacings and relative intensities set forth in Table A:

TABLE A

| 2-θ | d (Å) | I/I$_0$ % |
|---|---|---|
| 3.86–4.22 | 22.87–20.92 | w–m |
| 7.60–7.84 | 11.62–11.27 | s–vs |
| 11.58–11.86 | 7.64–7.46 | w–m |
| 13.29–13.54 | 6.65–6.53 | m |
| 13.90–14.20 | 6.36–6.23 | w |
| 15.34–15.68 | 5.77–5.65 | m |
| 19.30–19.65 | 4.60–4.51 | m |
| 20.37–20.73 | 4.35–4.28 | m–s |
| 23.18–23.54 | 3.83–3.78 | m–s |
| 23.57–23.89 | 3.77–3.72 | s–vs |
| 24.68–25.03 | 3.60–3.55 | m–s |
| 26.84–27.23 | 3.32–3.27 | m |
| 28.15–28.58 | 3.17–3.12 | m |
| 31.25–31.71 | 2.86–2.82 | vs |
| 33.37–33.76 | 2.68–2.65 | w |
| 35.89–36.36 | 2.50–2.47 | m |
| 48.05–48.52 | 1.89–1.87 | w–m |
| 51.38–51.90 | 1.78–1.76 | w–m |
| 55.35–56.04 | 1.66–1.64 | w–m |
| 58.08–58.64 | 1.59–1.57 | w. |

\* \* \* \* \*